(12) United States Patent
Kasberger et al.

(10) Patent No.: US 10,680,444 B2
(45) Date of Patent: Jun. 9, 2020

(54) METHOD FOR PROVIDING AN ENERGY RESERVE FOR AN ENERGY SUPPLY SYSTEM

(71) Applicant: Fronius International GmbH, Pettenbach (AU)

(72) Inventors: Christian Kasberger, Waizenkirchen (AU); Martin Wolf, Marchtrenk (AU); Harald Hofer, Lambach (AU); Hannes Heigl, Hofkirchen an der Trattnach (AU)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 15/778,575

(22) PCT Filed: Dec. 9, 2016

(86) PCT No.: PCT/EP2016/080407
§ 371 (c)(1),
(2) Date: May 23, 2018

(87) PCT Pub. No.: WO2017/097967
PCT Pub. Date: Jun. 15, 2017

(65) Prior Publication Data
US 2018/0351363 A1    Dec. 6, 2018

(30) Foreign Application Priority Data
Dec. 11, 2015    (EP) .................................... 15199489

(51) Int. Cl.
*H02J 3/38*    (2006.01)
*H02J 7/35*    (2006.01)

(52) U.S. Cl.
CPC .............. *H02J 3/383* (2013.01); *H02J 3/386* (2013.01); *H02J 3/387* (2013.01); *H02J 7/35* (2013.01);
(Continued)

(58) Field of Classification Search
CPC .... H02J 3/383; H02J 7/35; H02J 3/387; H02J 3/386; Y02E 60/721; Y02E 10/763;
(Continued)

(56) References Cited

U.S. PATENT DOCUMENTS

2013/0241495 A1    9/2013   Min
2014/0070610 A1*   3/2014   Massoulie ................ H02J 9/00
                                                                                 307/23
(Continued)

FOREIGN PATENT DOCUMENTS

EP         2 485 359 A1     8/2012
WO      2017097967 A1     6/2017

OTHER PUBLICATIONS

International Search Report corresponding to International application No. PCT/EP2016/080407, dated Nov. 15, 2017 (24 pages).

*Primary Examiner* — M Baye Diao
(74) *Attorney, Agent, or Firm* — Maginot, Moore & Beck, LLP

(57) ABSTRACT

Energy supply system includes at least one local energy supply unit, at least one local energy consumption unit at least one local energy store, and a control unit which controls the energy consumption, by the at least one local energy consumption unit of the energy supply system, of the volume of energy generated by the at least one local energy generation unit, and the volume of energy stored in the at least one energy storage unit. After detecting at least one predictable future event which will influence the volume of energy generable by the energy consumption units and/or the (Continued)

volume of energy which can be drawn from the energy supply network and/or the volume of energy consumed by the energy consumption units, the control unit dynamically adapts an energy reserve, stored in the at least one local energy store, as a function of the detected events.

17 Claims, 10 Drawing Sheets

(52) U.S. Cl.
CPC ........... *Y02E 10/563* (2013.01); *Y02E 10/566* (2013.01); *Y02E 10/763* (2013.01); *Y02E 60/721* (2013.01); *Y04S 10/126* (2013.01)

(58) Field of Classification Search
CPC ... Y02E 10/566; Y02E 10/563; Y02E 60/126; Y04S 10/126
USPC ....................................................... 320/101
See application file for complete search history.

(56) References Cited

U.S. PATENT DOCUMENTS

| | | |
|---|---|---|
| 2014/0094979 A1 | 4/2014 | Mansfield |
| 2015/0155745 A1* | 6/2015 | Schuster ................. H02J 3/387 |
| | | 700/286 |

* cited by examiner

METHOD FOR PROVIDING AN ENERGY RESERVE FOR AN ENERGY SUPPLY SYSTEM

This application is a 35 U.S.C. 371 National Stage application of PCT/EP2016/080407, filed Dec. 9, 2016, and claims priority to European Application No. EP 15199489.4, filed on Dec. 11, 2015. The entire contents of the above-mentioned patent applications are incorporated herein by reference as part of the disclosure of this U.S. application.

The invention relates to a method for providing an energy reserve in an energy supply system and in particular to a control unit for an energy supply system which is suitable for drawing energy from an energy supply network or feeding energy into an energy supply network.

EP 2 485 359 A1 discloses an energy supply system on an energy supply network comprising a local solar generator and a battery store.

US 2013/241495 A1 discloses a control system for an energy storage system comprising an energy generation system, an energy store, a consumer and a connected energy supply network.

US 2014/094979 A1 discloses a system and a method for load management for managing predictable load peaks.

Intelligent energy management is increasingly gaining in importance, in particular in relation to the use of renewable resources to obtain energy. For supplying users or consumers with energy, predominantly with electrical energy, energy is increasingly being obtained from renewable resources, predominantly from sunlight, wind energy or hydro energy. In this context, the energy generation is increasingly taking place in an at least partly decentralised manner, where users or consumers not only consume energy, but also produce energy themselves and feed it into an energy distribution network or power grid. In this context, generated energy which a user or consumer obtains from a renewable energy source and which the user in question does not presently need is fed into an energy distribution network, for example a public low-voltage network. Depending on the time of day and the present weather conditions, a photovoltaic system may generate electrical power from sunlight which is not consumed or not entirely consumed by the generating user at the time of generation. Since decentralised energy generation using renewable energy sources, such as sunlight or wind power, has limitations in terms of their availability, energy supply systems increasingly have local energy storage units for storing energy. This makes it possible to buffer the presently occurring energy excess locally in the energy storage unit of the energy storage system and at a subsequent time either to feed the buffered energy into the energy supply network or to supply it to the local energy consumption unit for consumption. With an increasing proportion of renewable energy sources in energy production, the dependency of the user or consumer who operates the energy supply system and the dependency of the network operator or external events, which cannot or can scarcely be influenced, such as weather changes or disconnections, is greatly increasing. The energy stored in the local energy storage unit of the energy supply system forms an energy reserve for the associated user of the energy supply system, which makes it possible for him still to supply energy consumption units with energy and thus to operate them for a time even if the locally generated energy fails or is greatly reduced and if the energy which can be drawn from the energy supply network is reduced or fails.

In conventional energy supply systems, however, there is no intelligent adaptation of the held energy reserve. Instead, in conventional energy supply systems, a predetermined volume of energy is stored as an energy reserve. This means that the held energy reserve is not sufficient in some situations. After a time, this in turn leads to an insufficient energy supply for the local energy consumption units of the energy consumption system, and thus to failure of these local energy consumption units.

An object of the present invention is therefore to provide an energy supply system which has an optimised energy reserve.

According to the invention, this object is achieved by the features of the independent claims.

Accordingly, the invention provides an energy supply system which is suitable for drawing energy from an energy supply network or feeding it into the energy supply network, the energy supply system comprising:

at least one local energy supply unit for generating energy,
at least one local energy consumption unit for consuming energy,
at least one local energy store for storing energy, and a control unit which controls the energy consumption, by the at least one local energy consumption unit of the energy supply system, of the volume of energy generated by the at least one local energy generation unit, and controls the volume of energy stored in the at least one energy storage unit, the control unit, after detecting at least one predictable future event which will influence the volume of energy generable by the energy consumption units and/or the volume of energy which can be drawn from the energy supply network and/or the volume of energy consumed by the energy consumption units, dynamically adapting an energy reserve, stored in the at least one local energy store, as a function of the detected events by way of precaution before these events occur.

In one possible embodiment of the energy supply system according to the invention, the control unit has an evaluation unit which evaluates event alerts, comprising information received from information sources and/or sensor data received from sensors, to predict future events of relevance for the local energy supply.

In one possible embodiment, the control unit sets the energy reserve as a function of a configuration, stored in a configuration data store, of the energy supply system.

In one possible embodiment of the energy supply system according to the invention, when an energy reserve is being set the control unit automatically maximises the internal energy consumption, by the local energy consumption units of the energy supply system, of the volume of energy generated by the local energy generation units of the energy supply system.

In a further possible embodiment of the energy supply system according to the invention, the local energy generation units of the energy supply system generate energy from renewable resources, in particular from sunlight or wind power, and/or from non-renewable resources, in particular from fuels.

In a further possible embodiment of the energy supply system according to the invention, the local energy stores of the energy supply system comprise battery storage units for storing electrical energy, storage units for storing potential and/or kinetic energy, fuel storage units for storing chemical energy and/or thermal storage units for storing heat energy.

In a further possible embodiment of the energy supply system according to the invention, the energy reserve adapted by the control unit is stored in a local energy store of the energy supply system or distributed over a plurality of different local energy stores of the energy supply system.

In a further possible embodiment of the energy supply system according to the invention, in the event of an anticipated decrease in the locally generable energy as a result of the predicted events and/or in the event of an anticipated decrease in the energy which can be drawn from the energy supply network and/or in the event of an anticipated increase in the locally consumed energy, the stored energy reserve is automatically increased by the control unit of the energy supply system by way of precaution.

In a further possible embodiment of the energy supply system according to the invention, in the event of an anticipated increase in the locally generable energy and/or in the event of an anticipated increase in the energy which can be drawn from the energy supply network and/or in the event of an anticipated decrease in the locally consumed energy, the stored energy reserve is automatically reduced by the control unit of the energy supply system by way of precaution.

In a further possible embodiment of the energy supply system according to the invention, the control unit changes an adaptation rate, at which the energy reserve stored in the at least one energy store is adapted, as a function of the internal energy consumption and/or of a preliminary time period between the receipt of an event alert announcing at least one future event and the actual occurrence of the event announced by the event alert.

In a further possible embodiment of the energy supply system according to the invention, the control unit adapts the volume of the energy reserve stored in the at least one energy store as a function of a forecasted or probable duration of the event announced in the event alert.

In a further possible embodiment of the energy supply system according to the invention, a preparation unit is provided, and filters and/or processes event alerts in advance, in particular information originating from a plurality of different heterogeneous information sources or sensor data originating from a plurality of different heterogeneous sensors, in relation to the relevance thereof to the local energy supply of the energy supply system.

In one possible embodiment of the energy supply system according to the invention, the preparation unit transmits the event alerts which have been filtered and/or processed in advance to the control unit for dynamic adaptation of the energy reserve stored in the at least one local energy store of the energy supply system and/or for dynamic adaptation of the adaptation rate at which the energy reserve is adapted.

In a further possible embodiment of the energy supply system according to the invention, the preparation unit weights the event alerts in relation to the reliability thereof.

In a further possible embodiment of the energy supply system according to the invention, the event alerts comprise alerts which are relevant to the ongoing network operation of the energy supply network.

These event alerts comprise in particular infrastructure alerts relating to public infrastructure and/or network infrastructure, which originate from a server of a network operator and/or of a building authority.

In a further possible embodiment of the energy supply system according to the invention, the event alerts comprise georeferenced weather forecast alerts and/or weather alerts, which originate from a server of a weather forecasting service and/or of an insurance company.

In a further possible embodiment of the energy supply system according to the invention, the event alerts comprise alerts relating to the supply of fuels, which originate from a server of a fuel supplier and/or of an information service.

In a further possible embodiment of the energy supply system according to the invention, the event alerts comprise sensor data and/or parameters, in particular sensor data and/or parameters of the local energy generation units, local energy consumption units, local energy storage units and/or energy supply network.

In accordance with a further aspect, the invention provides a control unit having the features set out in claim 13.

Accordingly, the invention provides a control unit for an energy supply system, in particular for an energy supply system, which is suitable for drawing energy from an energy supply network or feeding it into the energy supply network, the control unit controlling an internal energy consumption, by at least one local energy consumption unit of the energy supply system, of the energy generated by at least one local energy generation unit of the energy supply system, and controlling the volume of energy stored in at least one local energy store of the energy supply system, the control unit, after detecting at least one predictable future event which will influence the volume of energy generable by the energy generation units and/or the volume of energy which can be drawn from the energy supply network and/or the volume of energy consumed by the energy consumption units, dynamically adapting an energy reserve, stored in the at least one local energy store, as a function of the detected events by way of precaution before these events occur.

In one possible embodiment of the control unit according to the invention, it has a user interface via which the energy reserve stored in the at least one local energy storage unit of the energy supply system can be set manually by a user.

In a further possible embodiment of the control unit according to the invention, the control unit is a local control unit provided in the energy supply system.

In a further possible embodiment of the control unit according to the invention, the control unit is a remote control unit which communicates with the energy supply system via a communications interface.

In a further possible embodiment of the control unit according to the invention, the control unit is integrated into a portable appliance and executes an application for dynamically adapting the stored energy reserve of the energy supply systems.

In one possible embodiment, the control unit is integrated into a mobile radio appliance.

The invention further provides a method for providing an energy reserve in an energy supply system, having the features set out in claim 15.

Accordingly, the invention provides a method for providing an energy reserve in an energy supply system, comprising the steps of:

detecting at least one future event which will influence the volume of energy generable by the energy generation units and/or the volume of energy which can be drawn from the energy supply network and/or the volume of energy consumed by the energy consumption units of the energy supply system; and adapting the energy reserve stored in at least one local energy store of the energy supply system as a function of the detected future events before they occur.

In one possible embodiment of the method according to the invention, the locally stored energy reserve is additionally set as a function of a present configuration of the energy supply system.

In one possible embodiment of the method according to the invention, when an energy reserve is being set the internal energy consumption, by local energy consumption units of the energy supply system, of the volume of energy generated by local energy generation units of the energy supply system is maximised.

In one possible embodiment of the method according to the invention, the energy supply network is monitored for the frequency thereof and/or for harmonics, and if a possible network failure is detected the energy reserve is adapted.

In accordance with a further aspect, the invention further provides an application program comprising program instructions for carrying out the method according to the invention for providing an energy reserve in an energy supply system.

In accordance with a further aspect, the invention further provides a data carrier which stores an application program of this type.

The invention further provides an energy supply network comprising a plurality of energy supply systems in accordance with the first aspect of the invention connected thereto.

Hereinafter, possible embodiments of the method according to the invention for providing an energy reserve for an energy supply system, of the control unit according to the invention of an energy supply system, and of the energy supply network according to the invention comprising a plurality of energy supply systems connected thereto are described in greater detail, referring to the accompanying drawings, in which.

In the drawings, corresponding reference numerals denote corresponding or similar units.

Figure 1:
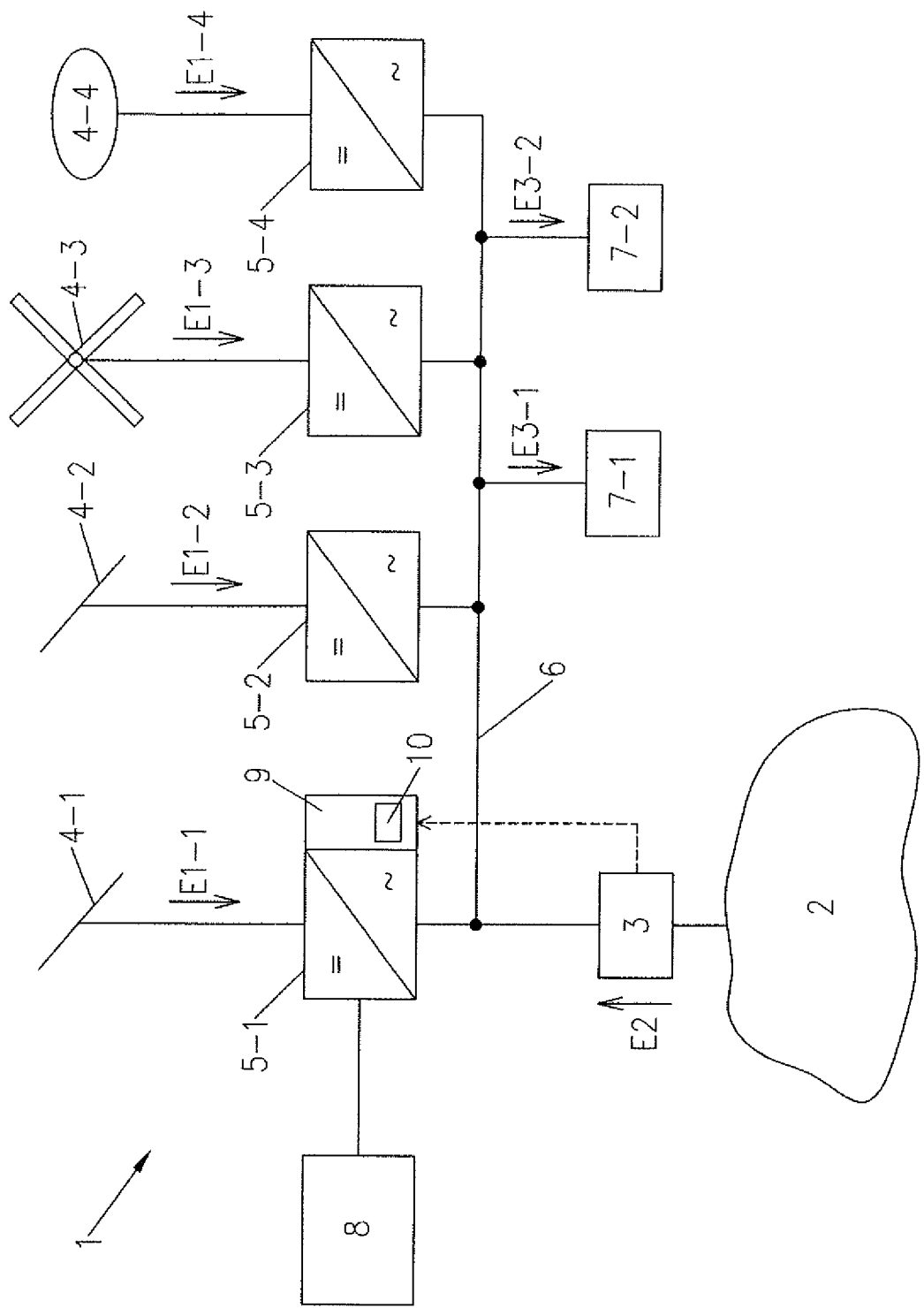
FIG. 1 is a circuit diagram illustrating an example embodiment of an energy supply system according to the invention in accordance with a first aspect of the invention.

FIG. 1 shows an example embodiment of an energy supply system EVA 1. The energy supply system 1 is suitable for drawing energy from an energy supply network or feeding it into this energy supply network 2. In one possible embodiment, the energy supply network 2 is a low-voltage or medium-voltage network. A plurality of energy supply systems 1 may be connected to the energy supply network 2. In the embodiment shown, the energy supply network 1 has a measurement unit 3, by means of which the energy fed into the energy supply network 2 and the energy drawn from the energy supply network 2 can be measured. The energy supply system 1 has at least one local energy generation unit 4 for generating energy. In the embodiment shown in FIG. 1, the energy supply system 1 has four local energy generation units 4-1, 4-2, 4-3, 4-4, which generate local energy. In the example shown, two photovoltaic systems 4-1, 4-2 which generate electrical energy from sunlight and a wind power system 4-3 which generates electrical energy from wind energy are provided. The local energy generation units 4-1, 4-2, 4-3 generate energy from renewable resources, specifically from sunlight or wind power. In addition, in one possible embodiment, the energy supply system 1 may also comprise at least one local energy generation unit 4-4 which generates energy from non-renewable resources, in particular from fuels. These fuels may for example comprise fossil fuels or hydrogen. The energy generation units are connected via invertors 5-1, 5-2, 5-3, 5-4 to a local energy distribution network 6, to which one or more local energy consumption units 7-1, 7-2 are connected. In the embodiment shown in FIG. 1, the photovoltaic system 4-1 is connected via an invertor 5-1 to the local network 6 of the energy supply system 1. The energy consumption units 7-$i$ may comprise different appliances, for example household appliances, machines or electric motors, or heat sources, such as a heat pump. The photovoltaic system 4-1 generates a direct electric current, which is converted by the invertor 5-1 into an alternating current, which either is fed to the energy supply network 2 via the measuring unit 3 or can be consumed by an energy consumption unit 7-$i$ locally. In the embodiment shown, at least one local energy storage unit 8 is connected to the invertor 5-1 of the first photovoltaic system 4-1. The local energy storage unit 8 is capable of storing or buffering energy. In one possible embodiment, the local energy storage unit 8 of the energy supply system 1 is a battery storage unit for storing electrical energy. In a further possible embodiment, the local energy storage unit 8 may also be a storage unit for storing potential or kinetic energy. In a further possible embodiment, the energy storage unit 8 also comprises fuel storage units for storing chemical energy. In a further possible embodiment, the energy storage unit 8 may also comprise a thermal storage unit for storing heat energy.

The photovoltaic systems 4-1, 4-2 may comprise a plurality of solar cells which convert sunlight into electrical energy, the direct current DC generated thereby being converted by the invertor 5-1, 5-2 into alternating current AC. Further, in the embodiment shown in FIG. 1, the energy supply system 1 has a wind power system 4-3, a being able to drive a current generator via a transmission. The wind power system 4-3 is connected via a coupling element 5-3 to the local network 6. In one possible embodiment, this coupling means may contain a DC intermediate circuit.

As well as the regenerative energy sources 4-1, 4-2, 4-3, the energy supply system 1 may also have one or more energy generation units which generate electrical energy by combusting fuels. In the embodiment shown in FIG. 1, the energy supply system 1 has a generator 4-4 which generates energy by combusting fuels, for example fossil fuels or hydrogen, and feeds it into the local power grid 6 of the energy supply system 1 via the coupling unit 5-4.

The number and type of the various energy generation units 4-$i$ may vary, and is configurable by the operator or user in question of the energy supply system 1 in accordance with his requirements and the state of the energy supply system 1. By providing different types of energy generation units for his energy supply system 1, the user of the energy supply system 1 reduces his dependency on any one particular type of energy generation. In the embodiment shown in FIG. 1, an energy store is connected to the invertor 5-1, in such a way that a storage unit is formed. Optionally, a first photovoltaic system 4-1 may also be connected to this invertor 5-1. In alternative embodiments, a plurality of energy stores 8 connected to the storage unit may be provided. The number and type of the energy stores 8 of the energy supply system 1 that are used are also configurable. In the embodiment shown in FIG. 1, a measurement unit 3 is provided, which can measure the flow of energy out of the energy supply network 2 and into the energy supply network 2 and reports it to a control unit 9. In a further possible embodiment, local measurement units, which measure energy consumed by the associated energy consumption unit and report it to the control unit, may also be provided for the various energy consumption units 7-1, 7-2. Further, in one possible embodiment, the energy consumption units 7-1, 7-2 may be connected to the local network 6 via switching units, the switching units preferably being actuable or switchable by the control unit 9. Further, in one possible embodiment, for each energy generation unit 4-i an associated measurement unit may be provided, which measures the volume of energy generated by the associated energy generation unit 4-1 and reports it to the control unit 9 of the energy supply system 1. In the embodiment shown in FIG. 1 of the energy supply system 1, the control unit 9 is integrated into the first invertor 5-1. Naturally, the control device 9 may also be connected to the invertor via a data connection. The control unit 9 controls an internal energy consumption EEV of the volume of energy generated by the at least one local energy generation unit 4-1 by at least one local energy consumption unit 7-i of the energy supply system 1. Further, the control unit 9 controls or regulates the volume of energy stored in the at least one energy store 8.

The control unit 9 is configured in such a way that, after detecting at least one predictable future event EV which will influence the volume E1 of energy generable by the energy consumption units 4-1 and/or the volume E2 of energy which can be drawn from the energy supply network 2 and/or the volume E3 of energy consumed by the energy consumption units 7-i, it dynamically adapts an energy reserve ER, stored in the at least one local energy store 8, as a function of the detected events by way of precaution before these events occur.

For this purpose, the control unit 9 preferably has an evaluation unit or data evaluation unit 10 which evaluates event alerts EM. These event alerts comprise information received from information sources and/or sensor data received from sensors. The evaluation unit 10 evaluates the received event alerts to predict future events EV of relevance to the local energy supply. The event alerts EM comprise in particular information which may originate from a plurality of different heterogeneous information sources. Further, the event alerts may comprise information from sensors, or sensor data, which originates from a plurality of different heterogeneous sensors. In one possible embodiment, the event alerts EM received by the evaluation unit 10 comprise alerts of relevance to the ongoing network operation of the energy supply network 2. These event alerts EM are for example infrastructure alerts relating to public infrastructure and/or network infrastructure. In one possible embodiment, these event alerts originate from a server of a network operator and/or of a building authority. For example, as an event alert EM, a building authority may transmit information to users close to a building site if the building site is going to lead to temporary switching-off of the local energy supply network 2, for example the local low-voltage network, for a particular time period. If for example in a street of a location the local energy supply network 2 is switched off temporarily in this region, those users who are operating an energy supply system 1 in this region can be informed by the building authority and/or the network operator. These infrastructure event alerts can be conveyed to the user or to the control unit 9 of the energy supply system 1 via various information channels, for example by SMS or e-mail or in some other way.

In a further possible embodiment of the energy supply system 1 according to the invention, as well as infrastructure event alerts the evaluation unit 10 of the control unit 9 also contains georeferenced weather forecast alerts and/or weather warning alerts. In one possible embodiment, these event alerts may originate from a server of a weather forecast service. In a further possible embodiment, these weather forecast alerts or weather warning alerts may also originate from a server of an insurance company with which the user or operator of the energy supply system 1 is insured.

In a further possible embodiment, the evaluation unit 10 of the control unit 9 additionally receives event alerts relating to the future supply of fuels. For example, the operator of the energy supply system can be informed about a future shortage in the supply of a particular fuel. For example, either the operator of the energy supply system 1 or the evaluation unit 10 may be informed that a particular fuel, for example fuel gas, is unavailable for a time as a result of an interruption to a supply line. The interruption to the fuel supply may for example lead to the generator 4-4 shown in FIG. not being operable for a particular time period in the future and thus also not being able to generate energy for the local network 6. In one possible embodiment, the event alerts relating to the future supply of the same or different fuels may originate from a server of a fuel supplier and/or from a server of an information service.

The event alerts EM may originate from a plurality of different heterogeneous sources. In one possible embodiment, the control unit 9 comprises a user interface via which the energy reserve ER stored in at least one local energy store 8 of the energy supply system 1 can be set manually by a user or operator of the energy supply system 1. In the embodiment shown in FIG. 1, the control unit 9 is integrated into the invertor 5-1 of the first photovoltaic system 4-1, in other words locally into the EVA 1. In an alternative embodiment, the control unit 9 may also be a remote control unit 9 which communicates with the energy supply system 1 via a communications interface. In this context, the control unit 9 may for example be integrated into a portable appliance, in particular into a mobile radio appliance, and execute an application for dynamically adapting the stored energy reserve ER of the energy supply system 1.

In a preferred embodiment of the energy supply system 1, when an energy reserve ER is being set the control unit 9 maximises the internal energy consumption EEV, by the various local energy consumption units 7-i of the energy supply system 1, of the volume of energy generated by the local energy generation units 4-1 as a whole. The number of energy consumption units 7-i within the energy supply system 1 of a user may vary. In one possible embodiment, the energy supply system 1 is an energy supply system of a private home and comprises household appliances as energy consumption units 7-i, for example a washing machine or an electric boiler and other appliances, for example machines, heat pumps or the like. Further, the energy supply system 1 may also be an energy supply system of a company which operates work machines of the company using the locally generated energy. Further typical examples of energy consumption units 7-i are air conditioning systems, electrical heating appliances, dishwashers, electric cookers and the like. Using switching units, the control system 9 controls the energy consumption units 7-i of the energy supply system 1 in such a way that the proportion of energy generated by the energy generation units 4-i of the energy supply system themselves out of the energy consumed by the energy consumption units 7-i of the energy supply system 1 is at a maximum. In one possible embodiment, the proportion of the energy generated by the energy generation units 4-i themselves which is not consumed by the energy consumption units 7-i of the energy consumption system 1 themselves is either fed into the energy supply network 2 or preferably fed into the local energy store 8 of the energy supply system 1 by the control system 9. The control unit 9 thus preferably maximises the internal energy consumption on the basis of an optimum setting of the energy reserve ER. This has the advantage that the locally generated energy is mostly also locally consumed, and the EVA 1 is largely independent of the energy supply network 2. The control unit 9 not only provides continuous maximisation of the internal energy consumption EEV, but according to the invention also provides optimum dynamic adaptation of the energy reserve ER within the at least one energy store 9, in such a way that after at least one predictable future event EV is detected an energy reserve ER is dynamically adapted by way of precaution before this event occurs in such a way that the energy supply system 1 can reliably provide for the internal energy consumption for as long a time period as possible even if an unfavourable overall situation occurs.

In the event of a predictable critical natural event, for example a hailstorm presumed to arrive in one hour, the energy reserve ER is increased by the control unit 9 by way of precaution, since the anticipated hailstorm may lead to a reduction in the energy generated by the renewable energy sources 4-i and also to a potential interruption to free-hanging connection lines to the energy supply network 2.

In the event of an anticipated failure of the locally generated energy E1 as a result of the predicted events or in the event of an anticipated failure of the energy E2 which can be drawn from the energy supply network and/or in the event of an anticipated increase in the locally consumed energy E3, the energy reserve ER stored in the local energy store 8 is automatically increased by the control unit 9 of the energy supply system 1 by way of precaution. Conversely, in the event of an anticipated increase in the locally generable energy E1 as a result of the predicted events and/or in the event an anticipated increase in the energy E2 which can be drawn from the energy supply network and/or in the event of an anticipated decrease in the locally consumed energy E3, the energy reserve ER stored in the local energy store 8 is automatically reduced by the control unit 9 of the energy supply system 1 by way of precaution, as can also be seen from FIGS. 8 and 9.

In a further possible embodiment, an adaptation rate AR at which the energy reserve ER stored in the at least one energy store 8 is additionally altered by the control unit 9. This preferably takes place as a function of a preliminary time period between the receipt of an event alert EM announcing at least one future event EV and the actual occurrence of the event announced by the event alert. If for example an imminent hailstorm is reported, the adaptation rate AR at which the store energy reserve ER is adapted is increased, in other words for example the charging speed at which a battery store 8 is charged is increased. If for example it is reported that the hailstorm will only approach in a few hours, there is the possibility of building up the energy reserve ER more slowly or at a lower adaptation rate AR. The adaptation rate AR is accordingly selected by the control device 9 as a function of the EEV. It would therefore be optimal to provide the energy reserve ER with the locally generated energy E1. If this is not possible given the event, energy is drawn from the network.

In a further possible embodiment, the control unit 9 adapts the volume of energy in the energy reserve ER stored in the at least one energy store 8 as a function of a forecasted or probable event duration of the event announced in the event alert. If for example an infrastructure alert reports that the energy supply network 2 in question has to be switched off for a relatively long time period of several days, the held energy reserve ER is set correspondingly higher. Conversely, if the energy supply network 2 is only switched off for a few hours as a result of a building activity, the held energy reserve ER can be set correspondingly lower.

In the energy supply system 1 according to the invention, the energy volume or ER held for an emergency power situation can be adapted dynamically. The volume in the held energy reserve ER can for example be influenced by parameters such as probability of failure and duration of failure. The control system 9 continuously ensures maximisation of the internal energy consumption EEV and optimisation of the energy reserve or emergency power reservoir ER. This means that in an optimum situation 100% of the locally generated energy is consumed locally and/or stored locally.

Figure 2A:
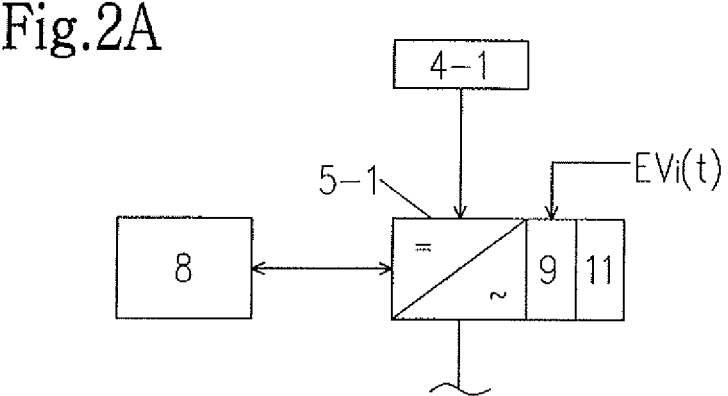
FIG. 2A, 2B, 2C are circuit diagrams illustrating various variant configurations of a control unit used in the energy supply system according to the invention.
Figure 2B:
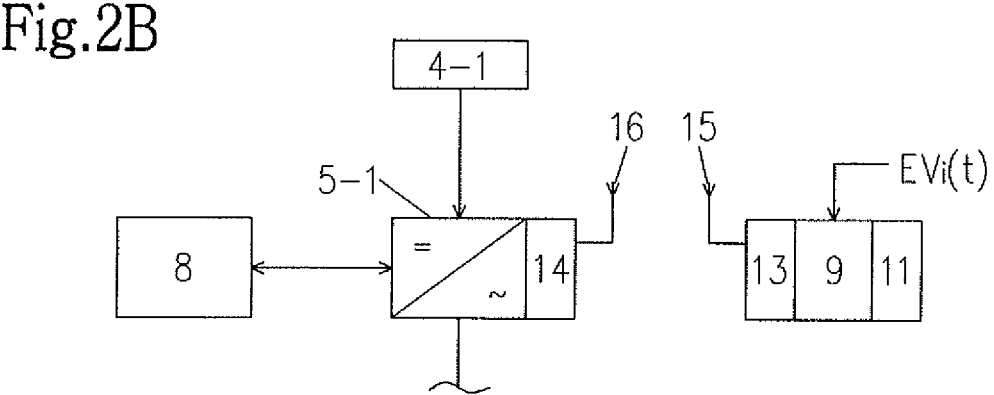
Figure 2C:
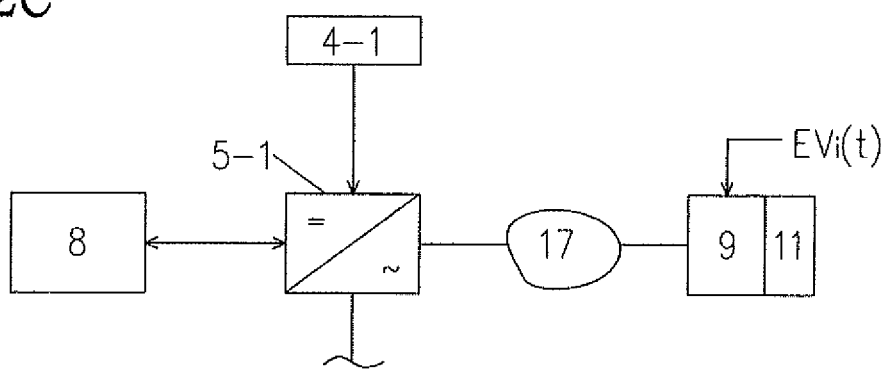

FIG. 2A, 2B, 2C show different variant configurations of the energy supply system 1 according to the invention in relation to the arrangement of the control unit 9. In the variant configuration shown in FIG. 2A, the control unit 9 is integrated into an invertor 5-1 of a local energy generation unit 4-1, and preferably has a user interface 11. Via the user interface 11, the user or operator of the energy supply system 1 has the possibility of setting the held energy reserve ER manually. The control unit 9 or the evaluation unit 10 integrated into it receives a continuous stream of events EV, which are continuously evaluated so as to adapt the energy reserve ER automatically and dynamically by way of precaution. In one possible embodiment, the presently held energy reserve ER can be displayed to the associated user via a display of the user interface 11. Further, the continuous stream of event alerts EM or events EV which bring about the dynamic precautionary adaptation of the energy reserve ER can be displaced to the user via the user interface 11. Further, in one possible embodiment, by way of the user interface there is the possibility for the user manually to input event alerts himself, which are taken into account by the evaluation unit of the control unit 9 in the adaptation of the energy reserve ER.

FIG. 2B shows as a further embodiment a control unit 9 which is integrated into a portable appliance 12 and which communicates wirelessly, by way of a transceiver 13 likewise contained therein, with a remote transceiver 14 via antennae 15, 16. In the embodiment shown, the transceiver 14 is integrated into the invertor 5-1. The energy reserve ER in the energy store 8 is dynamically adapted automatically and/or manually as a function of control signals which the transceiver 14 receives wirelessly from the remote control unit 9. The portable appliance shown in FIG. 2B may for example be a mobile radio appliance or a mobile telephone of a user of the energy supply system 1. In this context, the evaluation unit 10 contained in the control unit 9 evaluates a stream of events or event alerts and generates corresponding control signals for setting the energy reserve ER, the control signals for setting the energy reserve being transmitted via a radio interface from the mobile radio appliance 12 to the transceiver 14 of the invertor 5-1.

FIG. 2C shows a further embodiment in which a control unit 9 is connected to the invertor 5-1 via a data network 17. The data network 17 may be a local data network, WAN/Internet or the like of the energy supply system 1 or be a data bus. The variant configurations shown in FIG. 2A, 2B, 2C may also be combined.

Figure 3B:
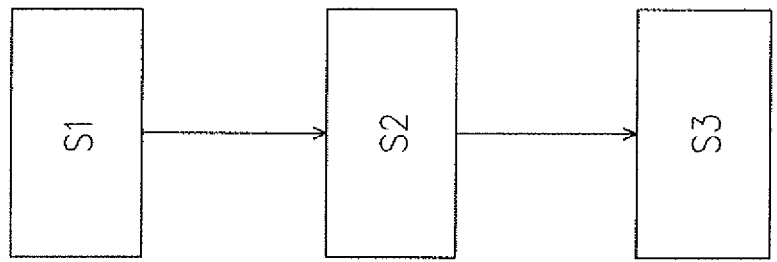
FIG. 3B is a further simple flow chart illustrating a further possible variant configuration of the method according to the invention for providing an energy reserve.
Figure 3A:
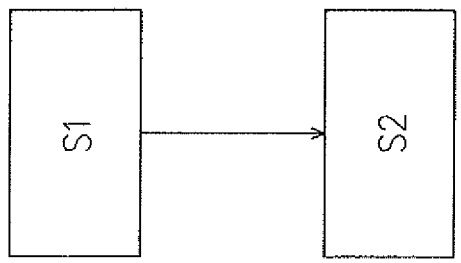
FIG. 3A is a simple flow chart illustrating a first variant configuration of the method according to the invention for providing an energy reserve.

FIG. 3A is a simple flow chart illustrating an embodiment of the method according to the invention for providing an energy reserve ER in an energy supply system 1.

In a first step S1, at least one future event EV is detected. This event influences the volume E1 of energy generable by the energy generation units 4-i of the energy supply system and/or the volume E2 of energy which can be drawn from the energy supply network 2 by the energy supply system 1 and/or the volume E3 of energy consumed by energy consumption units 7-i of the energy supply system 1. The events EV may influence the generable energy E1, the energy E2 which can be drawn and the consumed energy E3. For example, a storm warning may announce as an event a storm which is anticipated to lead to a major reduction in the generable solar energy, to a risk to the free-hanging connection lines to the local energy supply network 2, and to [an increase in] the energy E3 consumed by electrical heating means 7-i.

In a further step S2, the energy reserve ER stored in at least one local energy store 8 of the energy supply system 1 is adapted as a function of the detected future events before they occur. If for example a future storm is announced as an event, and leads to an anticipated reduction in the generable energy E1, an anticipated reduction in the energy E2 which can be drawn, and possibly simultaneously an increase in the energy E3 to be consumed, in step S2 the energy reserve ER stored in the local energy store 8 is dynamically increased by way of precaution before the storm occurs. The regulation thus takes place as a function of the EEV, in such a way that the ER can be provided with a high percentage of the locally generable energy E1. If the energy E1 is no longer sufficient to achieve the required ER, the store is also additionally charged via the network. For example, the regulation may also disconnect loads in a targeted manner so as to achieve the required energy reserve ER. FIG. 3B shows a further embodiment of the method according to the invention for providing an energy reserve ER in an energy supply system. In step S1, in the embodiment shown in FIG. 3A at least one future event EV is detected by evaluating event alerts EM. Subsequently, in step S2, the energy reserve ER is dynamically adapted as a function of the detected future event before it occurs.

Subsequently, in a further step S3, when an energy reserve is being set an internal energy consumption EEV of the volume of energy generated by the local energy generation units 4-i of the energy consumption system 1 by local energy consumption units 7-i of the energy supply system 1 is maximised.

Figure 4:
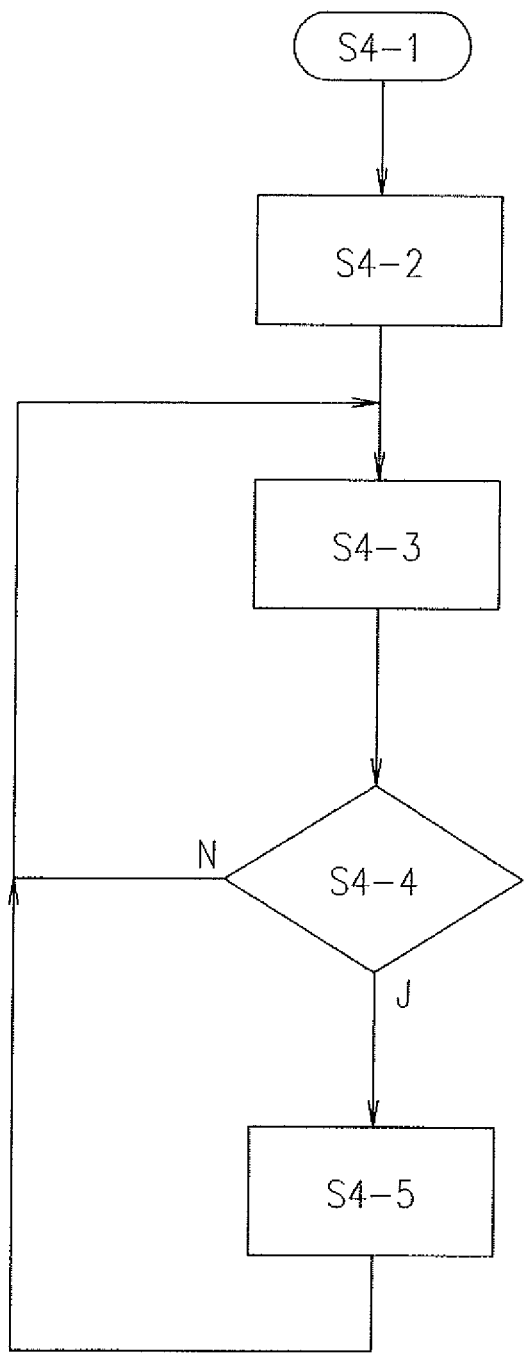
FIG. 4 is a further flow chart illustrating an embodiment of the method according to the invention for providing an energy reserve in an energy supply system.

FIG. 4 is a further flow chart illustrating an embodiment of the method according to the invention for providing an energy reserve ER. In the embodiment shown in FIG. 4, after a starting step S4-1, in a step S4-2 the held energy reserve ER is set to a configurable start value.

In a further step S4-3, the energy supply system 1 is operated in a normal operating mode when an energy reserve ER is being set, the control unit 9 of the energy supply system 1 maximising the internal energy consumption EEV of the volumes of energy generated by the local energy generation units 4-i of the energy supply system 1 by the local energy consumption units 7-i of the energy supply system 1. Once an event EV is reported to the evaluation unit 10 of the control unit 9 in step S4-4, in step S4-5 the local energy reserve is dynamically adapted to a new value. Subsequently, the process returns to step S4-3 (normal operation) until the next event EV is reported.

Figure 5:
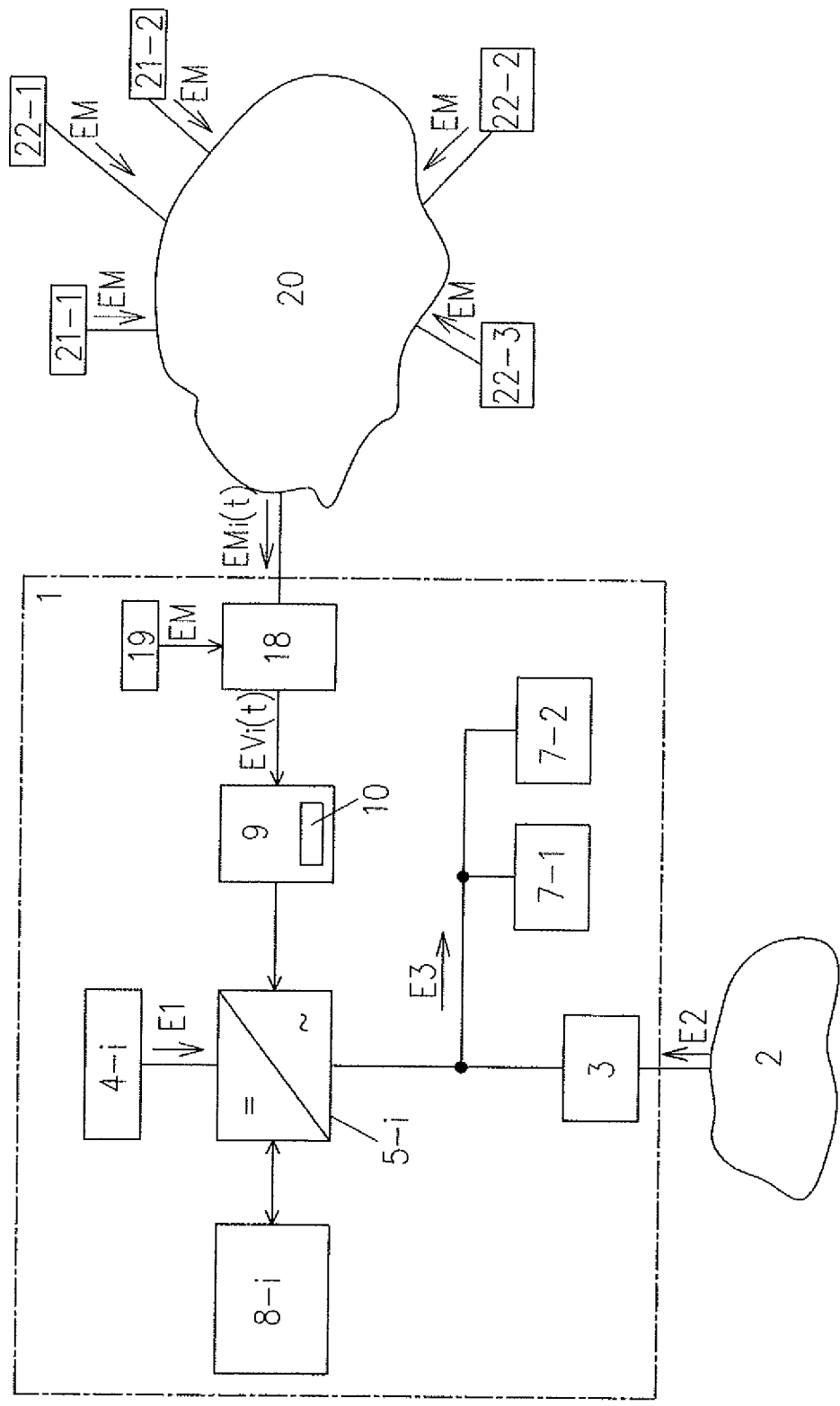
FIG. 5 is a diagram illustrating a further embodiment of an energy supply system according to the invention.

FIG. 5 shows a further embodiment of an energy supply system 1 according to the invention. In the embodiment shown, the energy supply system 1 has a local preparation unit 18 for preparing event alerts EM. These event alerts comprise information originating from a plurality of different heterogeneous information sources as well as sensor data originating from a plurality of different heterogeneous local sensors 19 and/or remote sensors 21. As is shown in FIG. 5, the preparation unit 18 may be upstream from the control unit 9. Alternatively, the preparation unit 18 may also be integrated into the control unit 9. In the embodiment shown in FIG. 5, the preparation unit 18 is connected to a data network 20, which is a local data network or a superregional data network, for example the Internet. A plurality of remote sensors 21-1, 21-2 and remote information sources 22-1, 22-2, 22-3, as shown in FIG. 5. In one possible embodiment, the preparation unit 18 may filter and/or process the event alerts EM in advance, in particular information originating from a plurality of different information sources 22-i and/or sensor data originating from a plurality of different remote or local sensors 19, 21-i. In one possible embodiment, the preparation unit 18 filters and processes the received event alerts EM in relation to the reliability thereof. In this context, event alerts originating from trustworthy information sources are weighted more heavily than event alerts from unknown information sources. For example, even longer-term weather forecasts may be classified as relatively untrustworthy. The event alerts EM which have been filtered and/or processed in advance are reported by the preparation unit 18 to the evaluation unit 10 of the control unit 9. The evaluation unit 10 dynamically adapts the energy reserve ER stored in the at least one local energy storage unit 8 of the energy supply system 1 as a function of the event alerts or events which have been processed in advance. Further, the evaluation unit 10 may dynamically adapt the adaptation rate AR for adapting the energy reserve ER. The event alerts received by the preparation unit 18 comprise different alerts originating from different information sources. One possible news source is for example the server of the network operator of the energy supply network 2 or the server of a building authority. In the embodiment shown in FIG. 5, for example, the first information source 22-1 is formed by the server of the network operator and supplies, as event alerts, infrastructure alerts relating to the future operation of the energy supply network 2. The second information source 22-2 is for example the server of a building authority which reports building activities in the region of the local energy supply network 2 to the relevant user or energy supply system operator. A further information source 22-3 supplies for example georeferenced weather forecast alerts or alerts relating to disturbances to the future supply of a particular fuel. Further, the event alerts EM may comprise sensor data and/or parameters, in particular sensor data and/or parameters of the local energy generation units 4-i, sensor data and/or parameter of the local energy consumption units 7-i, sensor data and/or parameters of the local energy stores 8-i, and/or sensor data and/or parameters of the energy supply network 2, for example the operating frequency f of the energy supply network 2.

Figure 6:
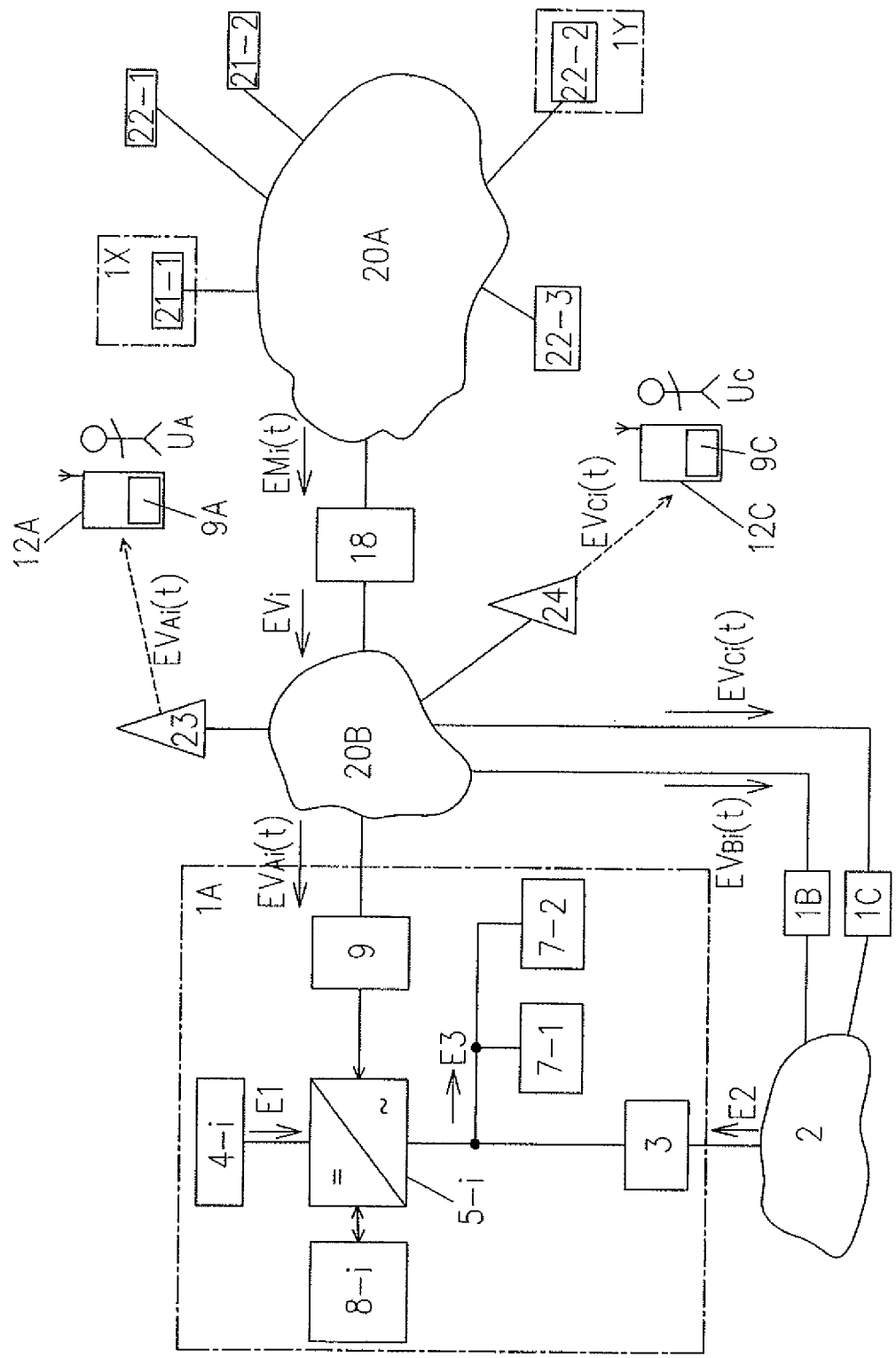
FIG. 6 is a diagram illustrating a further embodiment of an energy supply system according to the invention.

FIG. 6 shows an embodiment of a possible cluster of energy supply systems 1 according to the invention which are connected in an energy supply network 2. In the embodiment shown in FIG. 6, a plurality of energy supply systems EVA 1A, 1B, 1C are connected to a shared energy supply network 2. The first energy supply system 1A is shown in detail and corresponds to the energy supply system shown in FIG. 1. The three different energy supply systems 1A, 1B, 1C are connected to a data network 20A, in such a way that they receive event alerts EM or events EV in a stream of event alerts. This data network 20A distributes event alerts which are processed in advance or filtered in advance to the control units 9 of the various energy supply systems 1A, 1B, 1C, as is schematically indicated in FIG. 6 by the arrows for EVx and EMx. The advance filtering or advance processing of the event alerts EM takes place by way of a central preparation unit 18 which is provided between a first data network 20A and the second data network 20B. Naturally, the two data networks 20A, 20B may also form an integrated unitary data network. The event alerts EM received from different information sources 22-$i$ or remote sensors 21-$i$ are supplied via the data network 20A to the preparation unit 18, which processes or filters the plurality of different event messages EM in advance. In one possible embodiment, the preparation unit 18 additionally reformats the event alerts EM into a data format suitable for the evaluation units 10. The preparation unit 18 may for example be implemented in a server of a manufacturer of an energy supply system EVA. The preparation unit 18 filters the information or event alerts originating from a plurality of different heterogeneous information sources and the sensor data originating from a plurality of different heterogeneous sensors in relation to the relevance thereof to the local energy supply of the relevant energy supply systems 1A, 1B, 1C. Further, the preparation unit 18 can process the obtained event alerts in advance, in particular converting the data format thereof. In one possible embodiment, the preparation unit 18 additionally weights the received event alerts EM or events for the reliability of the data source, in other words the reliability of the sensor in question or information source in question. The event alerts which are filtered and/or processed in advance are transmitted from the preparation unit 18 via the data network 20B to the various control units 9 for dynamic adaptation of the energy reserves $ER_A$, $ER_B$, $ER_C$ stored in the associated energy stores 8 of the various energy supply systems 1A, 1B, 1C. In the embodiment shown in FIG. 6, the event alerts which are processed in advance for the energy supply systems 1A, 1C are additionally wirelessly transmitted via an access point 23 and/or a base station 24 to portable user terminals 12A, 12B of the two associated users $U_A$, $U_C$ of the two energy supply systems 1A, 1C. In the embodiment shown in FIG. 6, the portable appliances 12A, 12C are mobile radio appliances, these each having a control unit 9A, 9C which can execute an application for dynamically adapting the stored energy reserve $ER_A$, $ER_C$ of the associated energy supply systems 1A, 1C. If for example a user $U_A$ receives, by means of his mobile radio device 12A or mobile telephone, the events or event alerts which have been processed in advance by the preparation unit 18 and are relevant to his energy supply system 1A, the application executed on the mobile radio appliance 12A can calculate the required optimum energy reserve $ER_A$ and for example display it to the user $U_A$ via a display. In one possible embodiment, the user $U_A$ can subsequently approve or confirm the calculated energy reserve $ER_A$ to be adapted for his energy supply system 1A via a user interface of his mobile radio appliance 12A. The calculated energy reserve $ER_A$ is subsequently transmitted from the mobile radio appliance via the access point 23 and the data network 20B to the control unit 9A of the energy supply system 1A, which adapts the energy reserve stored in the energy store 8 accordingly. In a further possible embodiment, the user $U_A$, upon receiving an event alert EM from the preparation unit 18, for example in the event of a storm warning, can adapt the energy reserve manually in accordance with his own estimation via the user interface of his mobile radio appliance 12A. For example, the application executed on the mobile radio appliance 12A can calculate a recommended value of the energy reserve $ER_A$ to be set and display it to the user, the user having the possibility of confirming the calculating energy reserve $ER_A$ at this value or of manually setting it and only subsequently transmitting it to the control unit 9A of his energy supply system 1A. If for example a business traveller on a business trip receives an event alert EM relevant to his energy supply system 1 on his mobile radio appliance 12, he can adapt the energy reserve ER accordingly without having to be on-site.

Figure 7A:
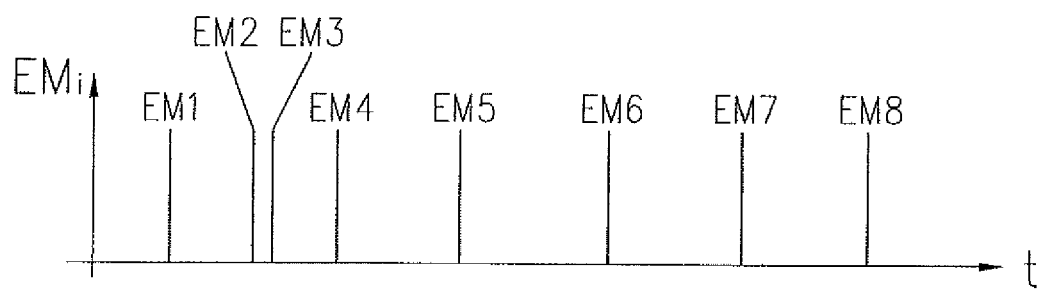
FIG. 7A, 7B are signal diagrams illustrating the mode of operation of the two embodiments of the energy supply system according to the invention shown in FIGS. 5 and 6.
Figure 7B:
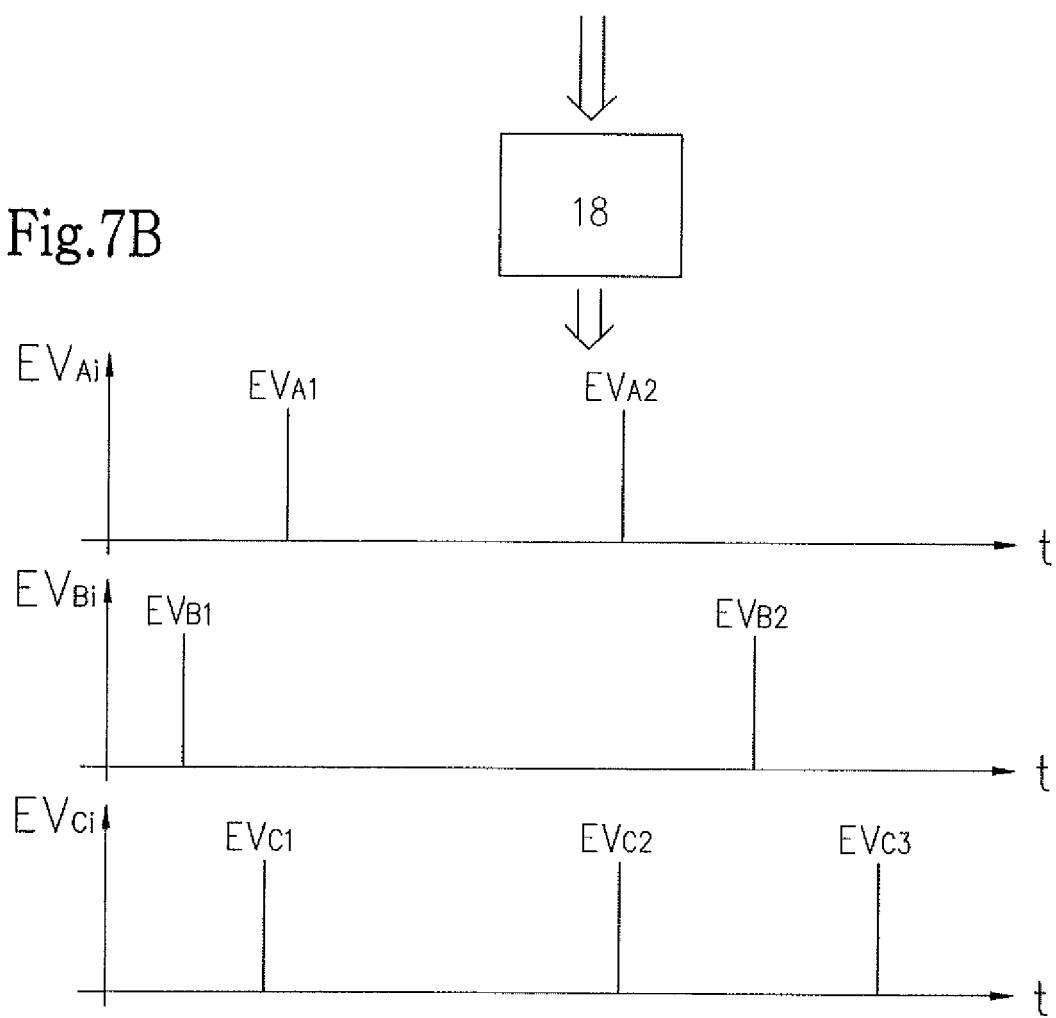

FIG. 7A, 7B are diagrams illustrating the mode of operation of the preparation unit 18 shown in FIG. 5, 6. In FIG. 7A, the preparation unit 18 receives a stream of heterogeneous event alerts EM, which may originate from information sources and/or sensors of various types. The preparation unit 18 filters out the relevant events or event alerts for the different energy supply systems 1A, 1B, 1C, as is shown in FIG. 7B. For example, the first event alert EM1 relates to the event EVC1 which is relevant to the energy supply system 1B, whilst the second event alert EM2 is reporting an event EVC1 relevant to the third energy supply system 1C. The third and sixth event alert EM3, EM6 relate to the first energy supply system 1A of the user $U_A$, who receives corresponding events for example via his mobile radio appliance 12$a$. The preparation unit 18 thus distributes event alerts EM to the relevant control units 9 of the energy supply systems which are affected in each case. If for example the first event alert EM1 is a weather warning which is only relevant for a particular area in which the energy supply system 1A is located, only the control unit 9 of this energy supply unit 1A actually receives this event sent from the preparation unit. Further, the preparation unit 18 may filter the received event alerts EM in advance. In the embodiment shown in FIG. 7A, 7B, the event alert EM 5 is for example filtered out because it originates from an unreliable information source. Preferably, the event alerts and the events EV generated therefrom are transmitted in a cryptographically protected manner to prevent any manipulation. In the example shown FIG. 7A, 7B, the event report EM6 for example reports an event which is relevant both to the first energy supply system EVA 1A and to the third energy supply system EVA 1C. This event alert EM6 may for example be an infrastructure report from a building authority announcing a building activity in a street region in which both the first energy supply system 1A and the third energy supply system 1C are connected to the energy supply network 2.

Figures 8A, 8B:
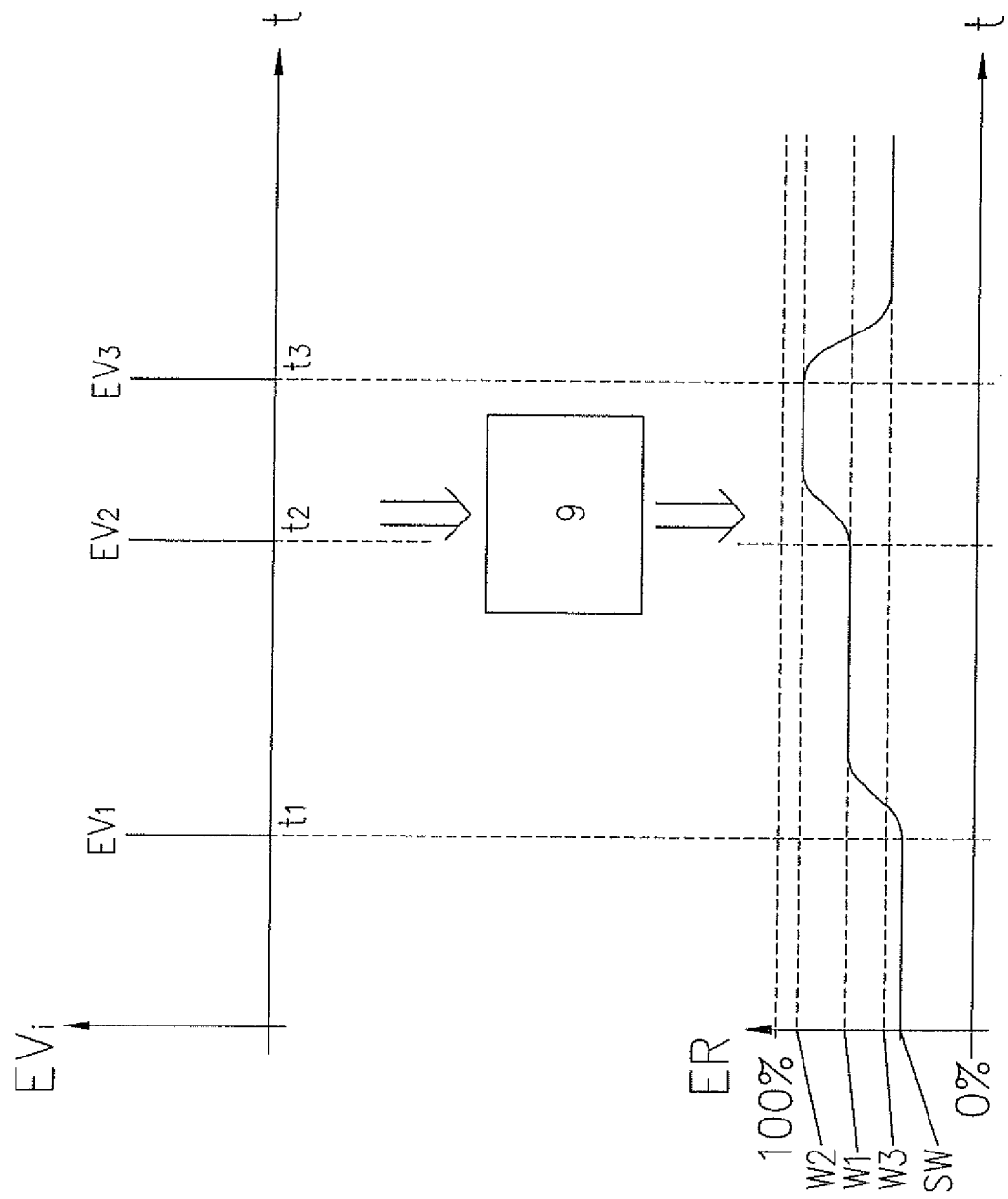
FIG. 8A, 8B are diagrams illustrating the mode of operation of a possible embodiment of a control unit used in the energy supply system according to the invention.

FIG. 8A, 8B illustrate the mode of operation, already described repeatedly above, of the control unit 9 in one possible embodiment of the energy supply system 1 according to the invention. At a time t1, the control unit 9 receives the events or an event alert and as a function of this event alert or the received event increases the energy reserve ER from a start value SW to a value W1, as is shown in FIG. 8B. If a further event alert arrives, which in each case is filtered or processed by the evaluation unit in advance, the control unit 9 increases the energy reserve ER further to a value W2. After the third event alert or the third event EV3 is received at the time t3, the control unit 9 reduces the energy reserve ER to a value W3, as is shown in FIG. 8B.

Figures 9A, 9B:
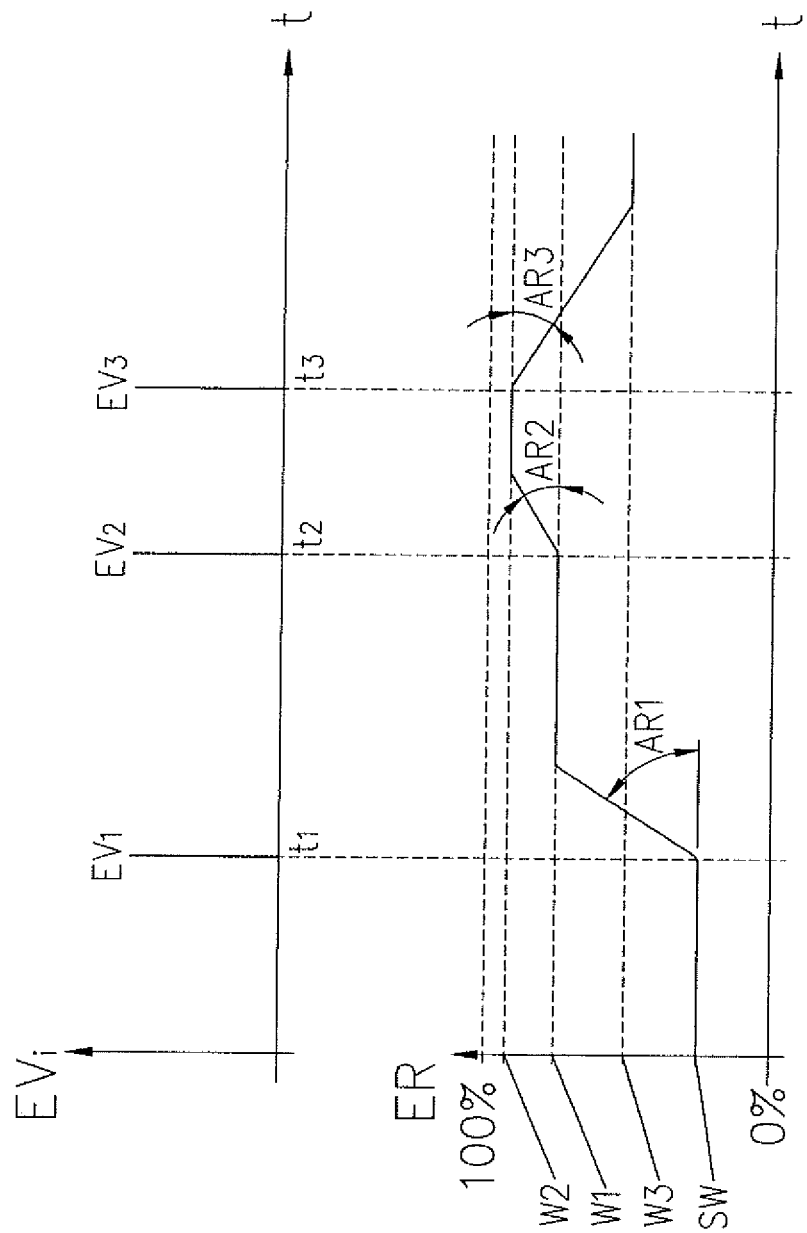
FIG. 9A, 9B are signal diagrams illustrating a further possible embodiment of the energy supply system according to the invention.

FIG. 9A, 9B are diagrams illustrating a further possible embodiment of the control unit 9 according to the invention. At a time t1, the control unit 9 receives an event alert or an event EV1 and increases the energy reserve at a relatively high adaptation rate AR1 from a start value SW to a value W1, as is shown in FIG. 9B. At a time t2, the control unit 9 receives a further event alert or an event EV2 and increases the energy reserve to a higher value W2 at a relatively low adaptation rate AR2, as is shown in FIG. 9B. After a further event alert or a further event EV3 is received at the time t3, the control unit 9 dynamically reduces the energy reserve ER at a negative adaptation rate AR3. The level of the adaptation rates AR1, AR2, AR3 depends on the information contained in the associated event alerts. If for example a very incisive event which is additionally imminent is reported, the corresponding adaptation rate AR is set relatively high in the control unit 9. The adaptation rate AR is accordingly set taking into account the internal energy consumption EEV. If the required energy reserve ER is not possible given the event EV and the resulting adaptation rate AR using the locally generated energy, the store is additionally charged via the network.

In principle, the energy reserve ER and the adaptation rate AR can also be adapted to the time of year or geographical situation. Thus, in winter, when relatively little energy can be generated using the photovoltaic system, the energy reserve ER can generally be kept at a higher level.

Figure 10:
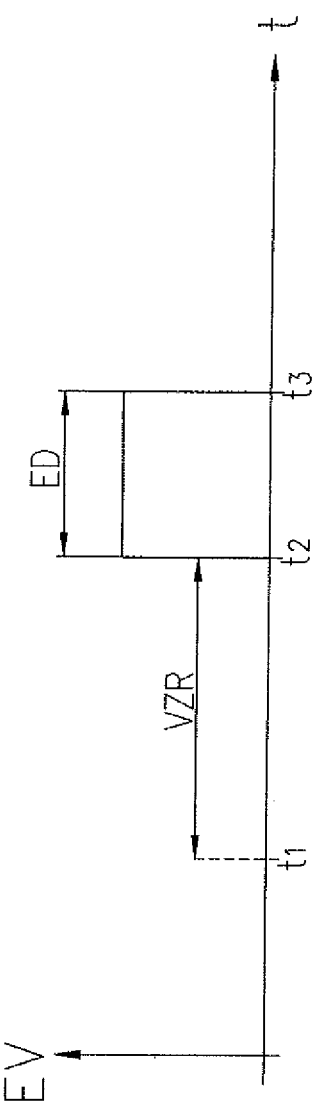
FIG. 10 is a further signal diagram illustrating a possible embodiment of the energy supply system according to the invention.

FIG. 10 is a further diagram illustrating factors influencing the adaptation rates AR shown in FIG. 9A, 9B. In one possible embodiment, the event reported to the control unit may specify a preliminary time period VZR and an event duration ED. In one possible embodiment, the control unit 9 varies the adaptation rate AR at which the energy reserve ER stored in the at least one energy storage unit 8 is adapted as a function of the preliminary time period VZR between the receipt at time t1 of an event alert EM, which announces a future event, and the actual occurrence at time t2 of the event announced by the event alert. Further, in one possible embodiment, the control unit 9 can adapt the volume of energy in the energy reserve ER stored in the at least one energy storage unit 8 as a function of a forecasted or probable event duration ED of the event EV announced in the event alert. For example, a weather warning alert reported to the control unit at time t1 may specify that the weather front will arrive at the position of the energy supply system 1 in approximately five hours and this weather will subsequently last for approximately two days at this location. The shorter the preliminary time period VZR and the higher the required adaptation of the energy reserve ER, the higher the adaptation rate AR1 is set by the control unit 9 of the energy supply system 1. If an announced event EV leads to an anticipated reduction in the locally generable energy E1, the longer the anticipated event duration ED of the associated event the higher the energy reserve ER has to be set. Using the method according to the invention, the volume of energy available from an energy store 8 for the emergency power situation can be adapted dynamically. The adaptation takes place taking into account the internal energy consumption EEV. This change can be triggered by internal and/or external prompts or events. In one possible embodiment, the energy reserve ER is automatically continuously adapted as a function of the received event alerts. In an alternative embodiment, the energy reserve ER is adapted time periodically at predetermined time intervals. The event alerts EM may be transmitted to the preparation unit 18 or the control unit 9 in any desired data formats, for example as an e-mail or SMS or in a data packet. The event alerts or information may be transmitted from the information sources or sensors to the preparation unit 18 or the control unit 9 in either a wired or a wireless manner.

In a further possible embodiment of the energy supply system 1 according to the invention, the energy E1 generable by the local energy generation units 4-$i$ depends on the associated configuration of the energy supply system. For example, a first energy supply system 1-1 has three wind power systems and no photovoltaic system, a second energy supply system 1-2 has two wind power systems and one photovoltaic system, a third energy supply system 1-3 has a wind power system and two photovoltaic systems, and a fourth energy supply system 1-4 has no wind power system and three photovoltaic systems. The energy E1 generable by the various energy supply systems 1-$i$ in bad weather with high wind strengths and low insolation depends on the configuration or composition of different local energy generation units. Whilst the first energy supply system 1-1 having three wind power systems generates a lot of energy locally in the event of bad weather and a lot of wind, the fourth energy supply system 1-4, which exclusively has photovoltaic systems, generates relatively little energy. In one possible embodiment of the energy supply system 1 according to the invention, the control unit 9 therefore sets the energy reserve ER not only as a function of the received event alerts or events, but additionally as a function of the stored local configuration CONFIG of the associated energy supply system 1. If, in the example shown, when a weather front with a lot of wind and little sun is approaching, the energy supply system 1 has a configuration with many wind power systems and few photovoltaic systems, the energy reserve ER is reduced by the control unit 9, whilst in another configuration of the energy supply system 1 with few wind power systems and many photovoltaic systems the energy reserve ER has to be increased when a bad weather front with a lot of wind and little sun is approaching. In one possible embodiment of the energy supply system according to the invention, the system configuration, in particular the type and power capacity of the various energy generation units 4-$i$, is stored in a local configuration data store of the control unit 9 and is taken into account in the evaluation of the event alerts EM for adapting the energy reserve ER.

In the method according to the invention, the energy reserve ER is dynamically adapted, it also being possible for this to take place on the basis of network frequency fluctuations of the energy supply network 2. If the measured network frequency f of the energy supply network 2 is relatively low and is below a nominal network frequency f0, the energy reserve ER can be set slightly higher by the control unit 9, since the probability of a network failure increases. In addition to or instead of measuring the network frequency, the harmonics can also be measured and the ER set accordingly.

In one possible embodiment, the control units 9 of the various energy supply systems 1 communicate with one another via a communications interface. Thus, for example, the various control units 9 of the various energy supply systems 1 may report the presently held energy reserves thereof to one another.

In a further possible embodiment of the energy supply system 1, historical energy flow or sensor data may also additionally be taken into account in adapting the energy reserve ER. In the method according to the invention, the energy reserve or emergency power reserve ER of a local energy supply system 1 is set optimally in advance so as to make the local energy supply as robust as possible against future scenarios or series of events and accordingly to keep the internal energy consumption EEC correspondingly high. In particular in safety-critical energy consumption units 7-*i*, the probability of failure of the local energy supply can thus be minimised or the remaining continued operating time when particular scenarios or series of events occur can be maximised.

The invention claimed is:

1. Energy supply system suitable for drawing energy from an energy supply network or feeding it into an energy supply network, the energy supply system comprising:
    (a) at least one local energy supply unit for generating energy,
    (b) at least one local energy consumption unit for consuming energy,
    (c) at least one local energy store for storing energy, and
    (d) a control unit which controls the energy consumption by the at least one local energy consumption unit of the energy supply system, of the amount of energy generated by the at least one local energy supply unit, and controls the amount of energy stored in the at least one local energy store;
    wherein the control unit, after detecting at least one predictable future event which will influence the amount of energy generable by the at least one local energy supply unit and the amount of energy which can be drawn from the energy supply network and the amount of energy consumed by the at least one local energy consumption unit, dynamically adapts an energy reserve, stored in the at least one local energy store, as a function of the detected events by way of precaution before these events occur,
    wherein the stored energy reserve comprises an amount of energy which is held for an emergency situation, and the stored energy reserve is influenced as a function of a probability of failure or a duration of failure.

2. Energy supply system according to claim 1, wherein the control unit has an evaluation unit which evaluates event alerts, comprising information received from information sources and/or sensor data received from sensors, to predict future events of relevance for the local energy supply.

3. Energy supply system according to claim 1, wherein the control unit sets the energy reserve as a function of a locally stored configuration of the energy supply system.

4. Energy supply system according to claim 1, wherein when an energy reserve is set the control unit automatically maximises the internal energy consumption, by the local energy consumption units of the energy supply system, of the amount of energy generated by the at least one local energy supply unit of the energy supply system.

5. Energy supply system according to claim 1, wherein the at least one local energy store of the energy supply system comprise battery storage units for storing electrical energy, storage units for storing potential and/or kinetic energy, fuel storage units for storing chemical energy and/or thermal storage units for storing heat energy.

6. Energy supply system according to claim 1, wherein the energy reserve adapted by the control unit is stored in the at least one local energy store of the energy supply system or distributed over a plurality of different local energy stores of the energy supply system.

7. Energy supply system according to claim 1 wherein, in the event of an anticipated decrease in the locally generable amount of energy as a result of the predicted events and/or in the event of an anticipated decrease in the amount of energy which can be drawn from the energy supply network and/or in the event of an anticipated increase in the locally consumed amount of energy, the stored energy reserve is automatically increased by the control unit of the energy supply system by way of precaution, and
    wherein, in the event of an anticipated increase in the locally generable amount of energy and/or in the event of an anticipated increase in the amount of energy which can be drawn from the energy supply network and/or in the event of an anticipated decrease in the locally consumed amount of energy, the stored energy reserve is automatically reduced by the control unit of the energy supply system by way of precaution.

8. Energy supply system according to claim 1, wherein the control unit changes an adaptation rate, at which the energy reserve stored in the at least one local energy store is adapted, as a function of the internal energy consumption and/or of a preliminary time period between the receipt of an event alert announcing at least one future event and the actual occurrence of the event announced by the event alert.

9. Energy supply system according to claim 1, wherein the control unit adapts the amount of the energy reserve stored in the at least one local energy store as a function of a forecasted or probable duration) of the event announced in the event alert.

10. Energy supply system according to claim 1, wherein a preparation unit filters and/or processes event alerts in advance, in particular information originating from a plurality of different heterogeneous information sources or sensor data originating from a plurality of different heterogeneous sensors, in relation to the relevance thereof to the at least one local energy supply unit of the energy supply system, in particular weighting them in relation to the reliability thereof, and transmits the, in particular reformatted, event alerts which have been filtered and/or processed in advance to the control unit for dynamic adaptation of the energy reserve stored in the at least one local energy store of the energy supply system and/or for dynamic adaptation of the adaptation rate at which the energy reserve is adapted.

11. Energy supply system according to claim 1, wherein the event alerts comprise alerts which are relevant to the ongoing network operation of the energy supply network, in particular infrastructure alerts relating to public infrastructure and/or network infrastructure, which originate from a server of a network operator and/or of a building authority, and/or wherein the event alerts comprise georeferenced weather forecast alerts and/or weather alerts, which originate from a server of a weather forecasting service and/or of an insurance company, and/or wherein the event alerts comprise alerts relating to the supply of fuels, which originate from a server of a fuel supplier and/or of an information service.

12. Energy supply system according to claim 1, wherein the event alerts comprise sensor data and/or parameters, in particular sensor data and/or parameters of the at least one local energy supply unit, sensor data and/or parameters of the at least one local energy consumption unit, sensor data and/or parameters of the at least one local energy store and/or sensor data and/or parameters of the energy supply network.

13. Control unit for an energy supply system according to claim 1, which is suitable for drawing energy from an energy supply network or feeding it into the energy supply network, wherein the control unit controls an internal energy consumption, by at the least one local energy consumption unit of the energy supply system, of the energy generated by at least one local energy supply unit of the energy supply system, and controls the amount of energy stored in at least one local energy store of the energy supply system, wherein the control unit, after detecting at least one predictable future event which will influence the amount of energy generable by the at least one local energy supply unit and the amount of energy which can be drawn from the energy supply network and the amount of energy consumed by the at least one local energy consumption unit, dynamically adapting an energy reserve, stored in the at least one local energy store, as a function of the detected events by way of precaution before these events occur, wherein the stored energy reserve comprises an amount of energy which is held for an emergency situation, and the stored energy reserve is influenced as a function of a probability of failure or a duration of failure.

14. Method for providing an energy reserve in an energy supply system, comprising the steps of:

detecting at least one future event which will influence the amount of energy generable by an energy supply unit of the energy supply system and the amount of energy which can be drawn from an energy supply network by the energy supply system and the amount of energy consumed by at least one local energy consumption unit of the energy supply system;

setting an energy reserve stored in at least one local energy store of the energy supply system as a function of at least one detected future event before the at least one detected future event occurs, wherein the stored energy reserve comprises an amount of energy which is held for an emergency situation, and the stored energy reserve is influenced as a function of a probability of failure or a duration of failure.

15. Method according to claim 14, wherein the stored energy reserve is additionally set as a function of a present configuration of the energy supply system.

16. Method according to claim 14, wherein when an energy reserve is being set the internal energy consumption, by the at least one local energy consumption unit of the energy supply system, of the amount of energy generated by the local energy supply unit of the energy supply system is maximised.

17. Method according to claim 14, wherein the energy supply network is monitored for the frequency thereof and/or for harmonics, and wherein if a possible network failure of the energy supply network is detected the energy reserve is adapted.

\* \* \* \* \*